US006646652B2

(12) United States Patent
Card et al.

(10) Patent No.: US 6,646,652 B2
(45) Date of Patent: Nov. 11, 2003

(54) SYSTEM AND METHOD FOR BROWSING NODE-LINK STRUCTURES BASED ON AN ESTIMATED DEGREE OF INTEREST

(75) Inventors: Stuart K. Card, Los Altos Hills, CA (US); David A. Nation, Hanover, MD (US)

(73) Assignee: Xerox Corporation, Stamford, CT (US)

( * ) Notice: Subject to any disclaimer, the term of this patent is extended or adjusted under 35 U.S.C. 154(b) by 341 days.

(21) Appl. No.: 09/748,027

(22) Filed: Dec. 21, 2000

(65) Prior Publication Data

US 2002/0118214 A1 Aug. 29, 2002

(51) Int. Cl.[7] ............................................... G06T 15/00
(52) U.S. Cl. .................................................... 345/645
(58) Field of Search .............................. 345/645, 853, 345/848, 419, 427, 440

(56) References Cited

U.S. PATENT DOCUMENTS

| 5,786,820 A | * | 7/1998 | Robertson ................... 345/853 |
| 6,057,843 A |   | 5/2000 | Van Overveld et al. .... 345/357 |
| 6,369,819 B1 | * | 4/2002 | Pitkow et al. ............... 345/440 |

OTHER PUBLICATIONS

Furnas, Generalized Fisheye Views, ACM, CHI'86 Proceedings, pp. 1623, 1986.*
Herman, Ivan et al. "Latour–A Tree Visualisation System", Graph Drawing 7th International Symposium, GD'99. Proceedings (Lecture Notes in Computer Science vol. 1731), Proceedings of Conference on Graph Drawing, Stirin Castle, Czech Republic, Sep. 15–19, 1999, pp. 392–399, XP002228747, 1999, Berlin, Germany, Springer–Verlag, Germany.

Noik, Emanuel G. "Exploring Large Hyperdocuments: Fisheye Views of Nested Networks", Proceedings CASCON '93, Proceedings of CASCON '93, Toronto, Ontario, Candada, Oct. 24–28, 1993, pp. 661–676, vol. 2, XP008012935 1993, Ottawa, Ontario, Canada, Nat. Res. Council of Canada, Canada.

Sarkar, Manojit et al. "Graphical Fisheye Views of Graphs", Striking a Balance, Monterey, May 3–7, 1992, Proceedings of the Conference on Human Factors in Computing Systems, Reading, Addison Wesley, US, May 3, 1992, pp. 83–91, XP000426810.

Turo, David et al. "Improving the Visualization of Hierarchies with Treemaps: Design Issues and Experimentation", Proceedings Visualization '92 (Cat. No. 92CH3201–1), Boston, MA, USA, Oct. 19–23, 1992, pp. 124–131, XP002228633 1992, Los Alamitos, CA, USA, IEEE Compt. Soc. Press, USA.

* cited by examiner

*Primary Examiner*—Phu K. Nguyen

(57) ABSTRACT

Method and system to enable a user to view large collections of linked information on a computer based display. A visualization is created which presents a representation of the complete collection of information on the display. The visualization fits completely within a fixed area of the computer-based display, negating the need to scroll information into the display area. The visualization is based on identified focus nodes and through calculation of a Degree of Interest (DOI) for each of the nodes based in the structure. Layout and presentation of the visualization structure is based on the DOI values in combination with considerations of available display space. A user may dynamically manipulate views of the structure by selecting one or more focus nodes, thus causing a recalculation of the degree of interest.

6 Claims, 14 Drawing Sheets

SYSTEM AND METHOD FOR BROWSING NODE-LINK STRUCTURES BASED ON AN ESTIMATED DEGREE OF INTEREST

FIELD OF THE INVENTION

The present invention relates to the field of information visualization and in particular to the display of representations of linked information based on user interest.

BACKGROUND OF THE INVENTION

Many applications of computers to practical problems involve the display of representations of linked information such as hierarchical data. Linked information refers to information that has some logical or organizational relationship. Examples are organization charts, computer programs, Web sites, filing systems, or biological taxonomies. These data structures are often much larger than will conveniently fit on the screen of a computer display monitor so that information can be easily extracted. But finding a way of presenting these structures to users such that (1) they can find elements in the structure quickly and (2) they can understand the relationship of an element to its surrounding context is an important enabler to many uses of such data.

One example is in the area of linked hierarchical data. Linked hierarchical data is often displayed in a tree structure. Several types of methods have been used to display such tree structures:

(1) Uniform layout of trees. Trees can be laid out uniformly. The number of nodes at the leaves of all the subtrees is computed and multiplied by an amount of space per node plus spacing between nodes and between subtrees. Then the nodes are scaled so that this fits across the display. This method works for small trees, but any attempt to portray a tree structure of moderate size, say 600 nodes, scaled to the width of a display will have the approximate appearance of a horizontal line, since the width increases exponentially while the height increases only linearly.

(2) Compressed layout of trees. The space required for the tree can be opportunistically compressed by sliding portions of deeper subtrees underneath shallow subtrees. If the tree has uniform depth, this is of no help. If the depth is non-uniform, more nodes can be accommodated in the same space, but this technique is only a limited improvement and cannot handle very large trees.

(3) Treemaps. Treemaps are described by Johnson, B. and Shneiderman, B. in the publication entitled "Treemaps: A space-filing approach to the visualization of hierarchical information structures", Proceedings of IEEE Information Visualization '91, 275–282. Treemaps is a technique in which lower subtrees are contained within higher nodes of the tree. A space is divided, say vertically, into a number of sections equal to the number of branches. Each section is then divided horizontally according to the number of branching at the next level down in the tree. The next level is then divided vertically again and so on alternating between vertical and horizontal definition of the space until it is too small to divide. Since creating a tree in this way does not allow any room for the content of nodes, the technique can be modified so that each division has extra space to be devoted to the node contents. This technique stays within predetermined space bounds, but as nodes become smaller and smaller they no longer have room for content (except for maybe a uniform color), the aspect ratios of the nodes vary widely, obscuring simple relationships.

(4) Techniques of variable manual expansion. Some techniques allow the user to choose which nodes are displayed. In this way, there need not be space for all nodes at the same time and those visible are ones more interesting to the user. One such technique was introduced in by Engelbart, D. C. and English, W. K., "A Research Center for Augmenting Human Intellect", *AFIPS Conference Proceedings of the* 1968 *Fall Joint Computer Conference*, San Francisco, Calif., December 1968, Vol. 33, pp. 395–410 (AUGMENT,3954,). Republished in *Computer Supported Cooperative Work: A Book of Readings*, Irene Greif [Editor], Morgan Kaufmann Publishers, Inc., San Mateo, Calif., 1988, pp. 81–105. The user indicates the higher and lower level numbers of the tree to be expanded. This technique allows the user to look horizontally across a tree structure. For example, a user might look at all the procedure call and variable declarations in a program, while suppressing the code itself, which resides at lower levels in the tree. The limitation of this technique is that there is no guarantee the tree will all fit on the display in any of these views and the user cannot expand one part of the tree, but not another. So the technique is usually paired with scrolling.

Another example of such a technique is used in the user interface of the Apple Hierarchical Filing System used on computer systems available from Apple Computer, Inc. of Cupertino Calif. Each level in the tree can be expanded individually by clicking on a small triangle to the left of the level. Thus the user can expand portions of the tree that are to be compared on the screen, while keeping other portions of the tree compressed by eliding nodes below the compressed subtree root. But this technique also needs to be paired with scrolling and considerable manual manipulation must be performed by the user to constantly adjust views.

(5) Fish-eye Views. Fish-eye views were described by Furnas, G. W. (1981/1999), in the publication "The FISHEYE View: A new look at structured files", reprinted in Card, S. K., Mackinlay, J. D.; and Shneiderman, B. (eds.) (1999), *Information Visualization: Using Vision to Think*. San Francisco: Morgan-Kaufmann. Fish-eye views describes a class of techniques in which nodes are displayed or elided according to the user's computed degree-of-interest (DOI) in them. The estimated DOI of a node=Intrinsic Importance+Distance from a focus node.

The Intrinsic Importance of a node is its distance from the root and the Distance of a node is the number of nodes that must be traversed by following parent and child links from the node of interest until reaching the subject node. All those nodes whose DOI lies below a certain threshold are not displayed. If the user indicates interest in some node, say by selecting it, this calculation is performed and the display elides those nodes below the threshold. In this way, the display of the tree follows the user's changing interest. The problem with this technique is that there is no guarantee the displayed trees will fit in any display bounds, thus wasting useful information space. The technique is especially problematic when there are a large number of sibling nodes in the tree.

(6) Focus+Context Displays. Focus+context displays are variants of fish-eye views that use various sorts of techniques to devote more space or detail of the display to some areas of interest, compressing other parts of the displayed structure to mainly support the context of the focus elements and showing the user where to select to navigate to a new position in the structure. One example of a focus+context hierarchical structure is cone-trees (see Robertson, G. G., Mackinlay, J. D. and Card, S. K. (1991). Cone trees: Animated 3D visualizations of hierarchical information. *Proceedings of CHI '91. ACM Conference on Human Factors in Computing Systems* New York, 198–194.). Cone-trees arrange the nodes in a 3-D tree. Selecting a node rotates a branch of the cone-tree, bringing related nodes into the foreground while sending other nodes into the background. This technique uses natural perspective to achieve some of the effect of Furnas's fish-eye views. Furnas' fish-eye view technique can be combined with cone-trees, thus allowing the display of larger trees. Because this is a 3-D display, some of the nodes occlude each other.

(7) Hyperbolic Trees. In hyperbolic trees the space itself is stretched according to a hyperbolic projection (see Lamping, J. and Rao, R. (1994), "Laying out and visualizing large trees using a hyperbolic space", *Proceedings of UIST '94, ACM Symposium on User Interface Software and Technology*, 13–14).

An implementation of a hyperbolic tree structure visualization is available from InXight Software, Inc. of Santa Clara, Calif.). Selecting a node moves it to the center (or side) of the display. Nodes further out are smaller and closer to each other. The display stays within fixed boundaries. But only a limited number of links out from the focus node can be seen. Moreover, it is more complicated to model complex user's DOI.

Despite such methods and techniques there remains a need to effectively display and extract useful information from large bodies of linked data.

SUMMARY OF THE INVENTION

The present invention provides for user browsing of large collections of linked information on a computer based display. A visualization is created which presents a representation of the complete collection of information on the display. The visualization fits completely within a fixed area of the computer based display, negating the need to scroll information into or out of the display area. The visualization is based on identified focus nodes and through calculation of a Degree of Interest (DOI) for each of the nodes in the structure. Layout and presentation of the visualization structure is based on the DOI values in combination with considerations of available display space. A user may dynamically manipulate views of the structure by selecting one or more focus nodes, thus causing a recalculation of the degree of interest.

The present invention may be used to display information units comprised of data items that are static, dynamic or a combination of both static and dynamic. An example of information units having static data items would be the nodes in an organization chart. An example of an information unit having dynamic data would be the representation of a web site wherein an information unit represents a web page within the site and includes a dynamic data item representing the number of "hits" that corresponding page is encountering over some period of time.

The method of the present invention is for displaying a representation of an entire collection of linked information using a visualization technique in a display area, said linked information comprised of a plurality of nodes each having one or more links to other of said plurality of nodes, the method generally comprising the steps of: identifying one or more focus nodes from said plurality of nodes; generating a degree of interest (DOI) value for each of said plurality of nodes, said degree of interest value relative to said one or more focus nodes and corresponding to a manner in which said node will be displayed; laying out said plurality of nodes according to said visualization technique so that said representation is displayed completely in said display area; displaying said linked information based on said layout of plurality of nodes in said display area

DETAILED DESCRIPTION OF THE INVENTION

Figure 1:
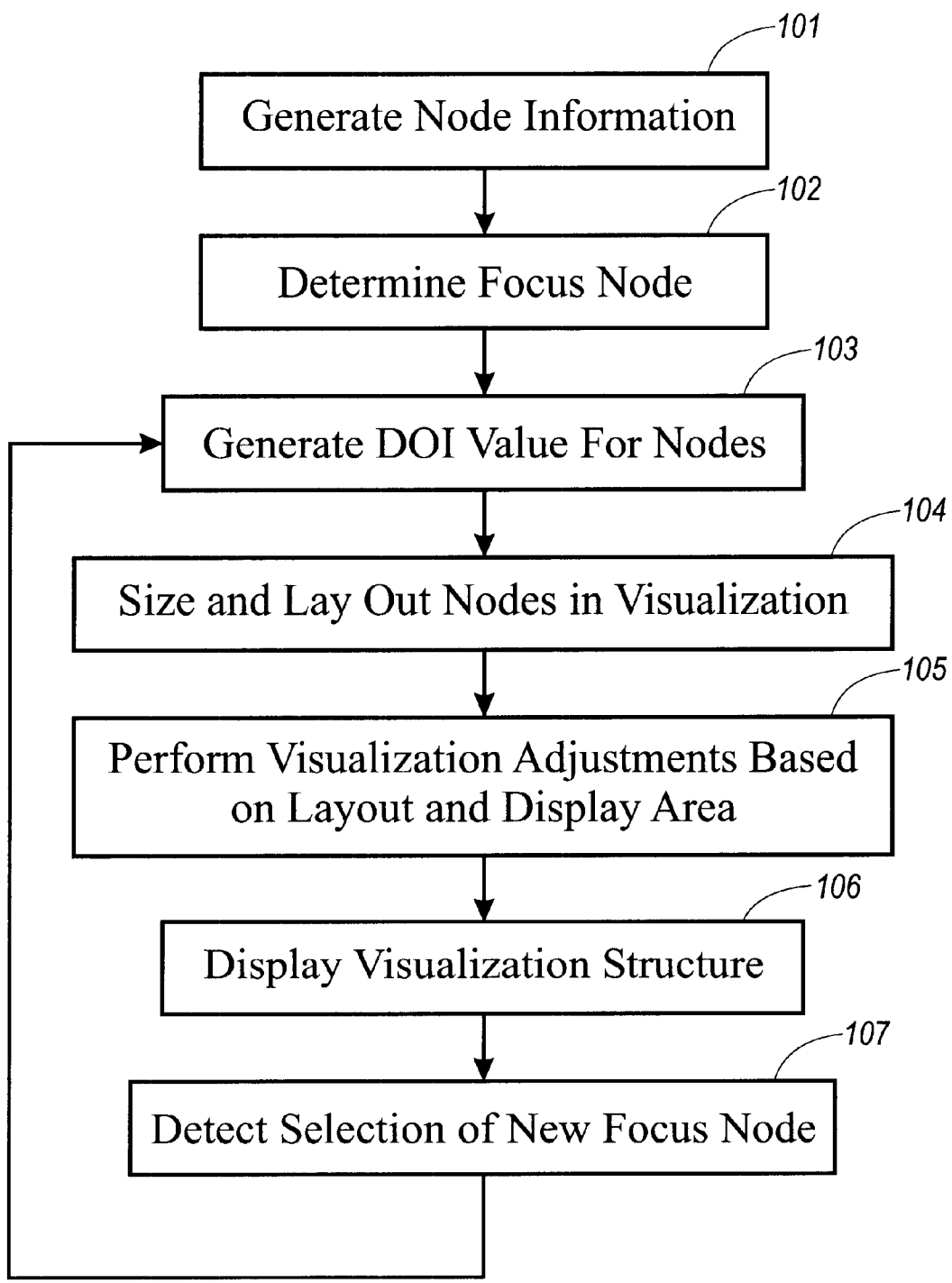
FIG. 1 is a flowchart of the basic steps for creating a visualization of a linked structure in the present invention.

The present invention provides an information visualization technique that enables a user to effectively browse through large collections of linked data. When utilizing the present invention a user is able to dynamically manipulate views of large amounts of displayed data so that the information presented is effectively perceived by the viewer. The present invention may be used to display information units comprised of data items that are static, dynamic or a combination of both static and dynamic. An example of information units having static data items would be the nodes in an organization chart. An example of an information unit having dynamic data would be the representation of a web site wherein an information unit represents a web page within the site and includes a dynamic data item representing the number of "hits" that corresponding page is encountering over some period of time.

The present invention operates on linked information, which can often be represented as a node-link structure. In a node-link representation, each node represents an information unit and the link represents a relationship amongst the different nodes. The underlying data may have some actual linkage (e.g. web pages or other documents containing hypertext links) or some logical linkage (e.g. the nodes comprising an organization chart).

The present invention has been implemented for operation on computer based systems having a graphical user interface such as those utilizing the Windows® Operating System form Microsoft, Inc. or the Mac OS operating System from Apple Computer, Inc. Such graphical user interfaces have the characteristic that a user may interact with the computer system using a cursor control device and/or via a touch-screen display, rather than solely via keyboard input device. Such systems also have the characteristic that they may have multiple "windows" wherein discrete operating functions or applications may occur. A more complete description of such a computer-based system upon which the present invention may be implemented is provided below.

Conceptual Framework

The present invention combines (a) the idea of computing Degree Of Interest (DOI) estimates of users' interest with (b) focus+context techniques for dynamically changing the view as the DOI changes and (c) adjustment of what is displayed based on available display resource (e.g. the viewable area of a computer display, or the size of a "window" on the display).

The present invention can be thought of as being modular so that the display of information to the user is computed in two parts: (1) an estimation of users' degree-of-interest in each of the nodes and (2) a visualization of the data based on the computed users' interest and the amount of available display resource. A visualization using the present invention may be used to present various visualizations of linked information such as tree structures or collections of hyper-linked documents. The present invention further uses animation to provide for smooth visual transitions to indicate changes of DOI in the displayed structure.

(1) Estimate of Users' Degree-Of-Interest in Nodes

The Degree of Interest (DOI) refers to a value attributed to a particular node with respect to some focus node. The DOI value provides a way of placing a quantitative value on the nodes. The DOI value may be calculated in many different ways, and is often directly related to the manner in which the data to be visualized is captured. For example, real time usage data may be used to calculate a DOI so the DOI value could be based on the usage.

In the prior art, the DOI of a node in a tree structure is estimated as the Intrinsic Importance plus the Distance from a focus node. The Intrinsic Importance represents the relevancy or importance of a node with respect to a root node and is measured as the number of nodes from the root node to the subject node. The Distance of a node from the focus node is the number of nodes that must be traversed by following parent and child links from the node of interest until reaching the subject node.

In the present invention, the degree of interest calculation for a tree structure is different from that disclosed in the prior art. In the prior art, all siblings' nodes that are the same distance from the focus node have the same DOI value. The calculation of the present invention treats the children of a parent node as ordered and assigns fractional DOI offsets to the children based on order distance from the focus node. The farther the sibling is from the focus node based on the ordering, the more the fractional decrement in its DOI (but the decrement is always less than 1). Further, the DOI of the children of the siblings is based on the siblings DOI. This allows the visualization element to decide which sibling nodes to compress and how to compress them.

(2) Visualization

As noted above, various visualization techniques may be used when implementing the present invention. Initially, each DOI value corresponds to a node size parameter. Typically, this node size parameter may correspond to a largest node size for a particular range of DOI values. Upon generation of the structure in the visualization, the nodes are laid out using the node size parameter along with any structure-based adjustments. These structure-based adjustments facilitate optimal use of the display area in terms of presenting information, as well as providing a smoother visual appearance of the structure. Further visualization compressions of the nodes in the structure may be made based on the available display area. For example, portions of the structure lying in predetermined areas may be aggregated, or certain portions of the structure may be collectively represented by a symbol as a result of their lower DOI values (wherein the size of the symbol may represent the number of nodes being represented). Alternatively, a displayed structure may not completely utilize a display resource, so visualization expansions may occur to more effectively utilize the available display resource.

Currently Preferred Embodiment

The currently preferred embodiment of the present invention is implemented to display hierarchically linked data in a tree structure. This is hereinafter referred to as a Degree of Interest (DOI) Tree. The DOI tree can be used to display various types of hierarchical information such as organization charts, file structures, or representations of web sites.

The following terminology is used to describe a tree structure. A root node refers to the topmost node in the structure and the one in which the rest of the tree structure emanates from. A tree structure will have multiple levels, each level representing a horizontal portion of the structure. The nodes in the tree structure will be connected via links. Nodes will have relationships with other nodes, which are termed parent, child or sibling. A node is a parent node to another node if it is directly linked and is one level above the other node. Similarly, a node is a child node if it is directly linked and is one level below the other node. Sibling nodes are those that lie on the same level and which have the same parent node.

FIG. 1 is a flowchart that describes the general method of the present invention. First, node information is generated for nodes in the visualization, step 101. This node information is generated using stored data for the nodes. A focus node is then determined, step 102. Upon the first display of the visualization, the focus node may be the "root" node, or it could be based on how display of the structure was requested. During browsing of the structure, the focus node would typically be identified by user selection of a particular node. The DOI for the nodes are then generated, step 103. As described above, the DOI is determined not only by the distance from the focus node, but also based on it's (or it's parent's) order with respect to the focus node. The nodes are then sized and laid out based on their DOI value, step 104. A manner in which nodes are sized is provided below with respect to pseudo code provided in Table 1. The manner in laying out the nodes is based on the visualization structure (e.g. a tree or some other structure). Visualization adjustments are then made to optimize use of the display area, step 105. As noted above, these visualization adjustments may be visualization compressions or visualization expansions. The visualization structure is displayed, step 106. When a new focus node is selected and detected, step 107, the steps repeat starting at step 103 with the new visualization structure preferably being displayed using animation techniques.

Table 1 provides pseudo-code that describes the manner of processing nodes in the currently preferred embodiment.

TABLE 1

Pseudo-Code For Processing Nodes (recursive for all nodes)
if focus node (i.e DOI = 0), set to large size
else if DOI value >−1 and <0 set to large size adjusted by fade value
else if DOI value >−2 and <=−1 set to medium size adjusted by fade value
else if DOI value >−4 and <=−2 set to small size
else elide display of node Referring to Table 1, the listed operations are repeated recursively for each node. Generally, the focus node will have the largest possible size, with smaller sizes being assigned based on the DOI value. The numerical values presented in Table 1 are for illustration and are actually parametric thresholds that could vary. Note that the node sizes are assigned based on DOI values falling within a particular range. Use of other values or parametric thresholds would not cause departure from the spirit and scope of the present invention. The option of a fade value is a technique for making small distinctions among nodes that would otherwise be the same size. The fade value is a fractional value used to decrease the size of nodes as they get further away from the focus node. For examples for a hierarchical structure a fade value of 0.10 would decrease the size of the row of nodes above and below the focus row by 10%. The next row above and below that rose would be 20% smaller. This permits more space for the focus node for large trees with many levels.

It should also be noted from Table 1 that if a DOI value falls below some particular threshold, here <−4, then the node will be elided (i.e. not displayed).

Calculation of the Degree of Interest

The basic calculation of the Degree of Interest (DOI) for nodes in using the standard layout follows the following rules:

1. The Focus nodes and parent nodes up to the root node are assigned a DOI value of 0.
2. Assign a DOI value of −1 plus offset to sibling nodes of nodes having a DOI value of 0.
3. For the rest of the nodes, assign a DOI value of one less than their parent node.

The standard layout is one where there is a single focus node. In an alternative scheme where there may be multiple focus nodes (e.g. nodes found as a result of some search) the rules for assigning the DOI would be as follows:

1. Assign a DOI value of −1 to all selected nodes;
2. Assign a DOI value of −1 to parents of selected nodes up to root node.
3. For the rest of the nodes, assign a DOI value of one less than their parent node.

With respect to the offset described above, the DOI calculation of the present invention treats the children of a parent node as ordered and assigns fractional DOI offsets to the children based on order distance from the focus node. The farther the sibling is from the focus node based on the ordering, the more the fractional decrement in its DOI (but the decrement is always less than 1).

Visualization of the DOI Tree

For the visualization of the DOI tree, there are a small number of possible node sizes for presenting the information associated with the node. For most tree structures, it has been determined that three is a reasonable number of nodes sizes, but utilization of five or some other number of node sizes would not cause departure from the spirit and scope of the present invention. As described above with respect to the general concepts, the particular node size used depends on the DOI of the node. A table may be used to map DOI values into node sizes during the creation of the visualization. The table may contain actual node sizes, or sizing factors for use in drawing each of the nodes.

Figure 2:
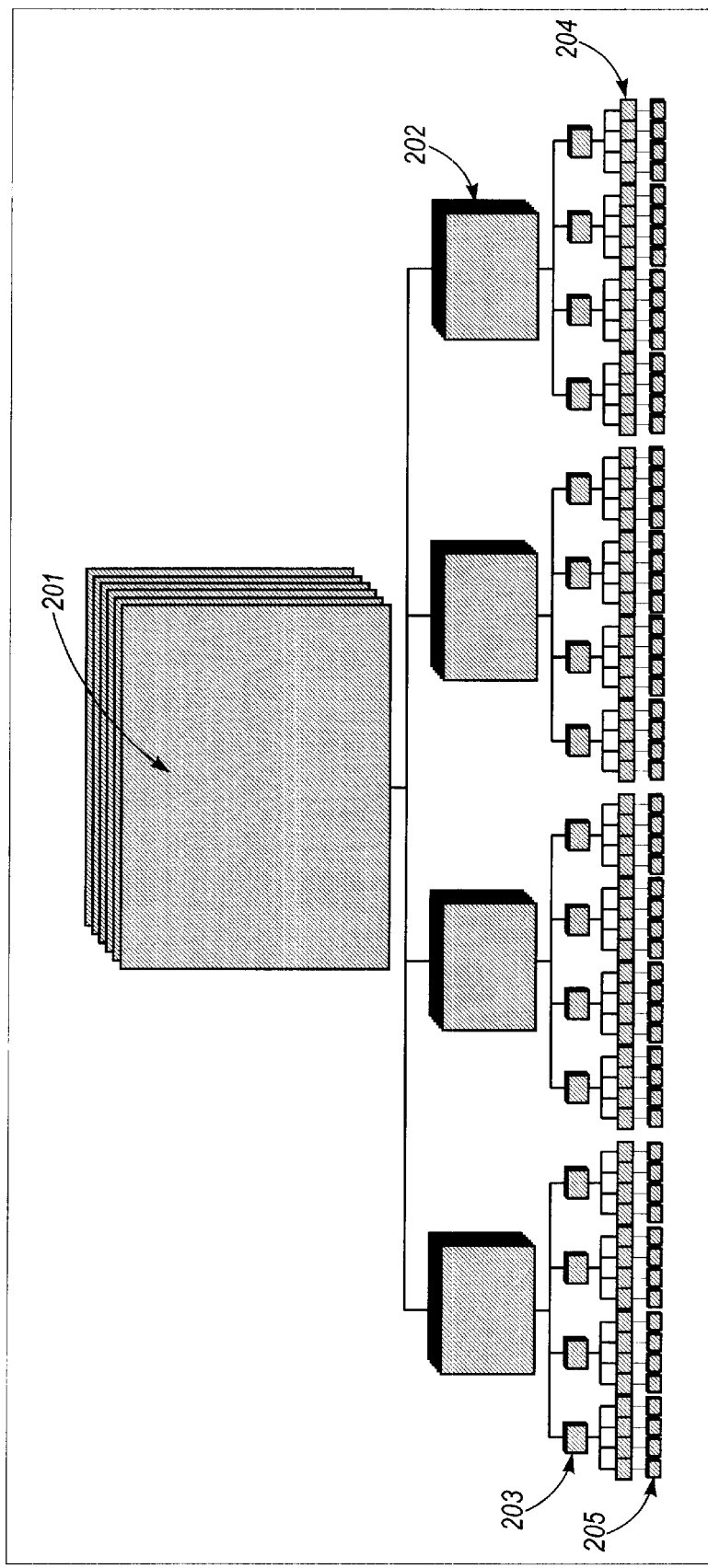
FIG. 2 is an illustration of a DOI tree of uniform structure having the root node as the focus node as may be displayed in the currently preferred embodiment of the present invention.

FIG. 2 shows the display of a uniform tree of 4 levels, with 4 branches at each level and the focus on root node 201. The root node 201 has been selected for the focus node and automatically has a larger size. To further indicate that it is a focus node, it may be displayed so that it is more visually distinct, e.g. in a different color than the other nodes. Smaller node sizes have been automatically selected for nodes with lower DOI. For example, nodes at level 202, level 203 and level 204 are represented as consecutively smaller. It should also be noted that in FIG. 2, because of display space constraints, the collections of nodes at level 205 (below level 204) are collectively represented as a triangle. In the currently preferred embodiment, the highest DOI is 0, the lower DOIs are negative numbers.

Figure 3:
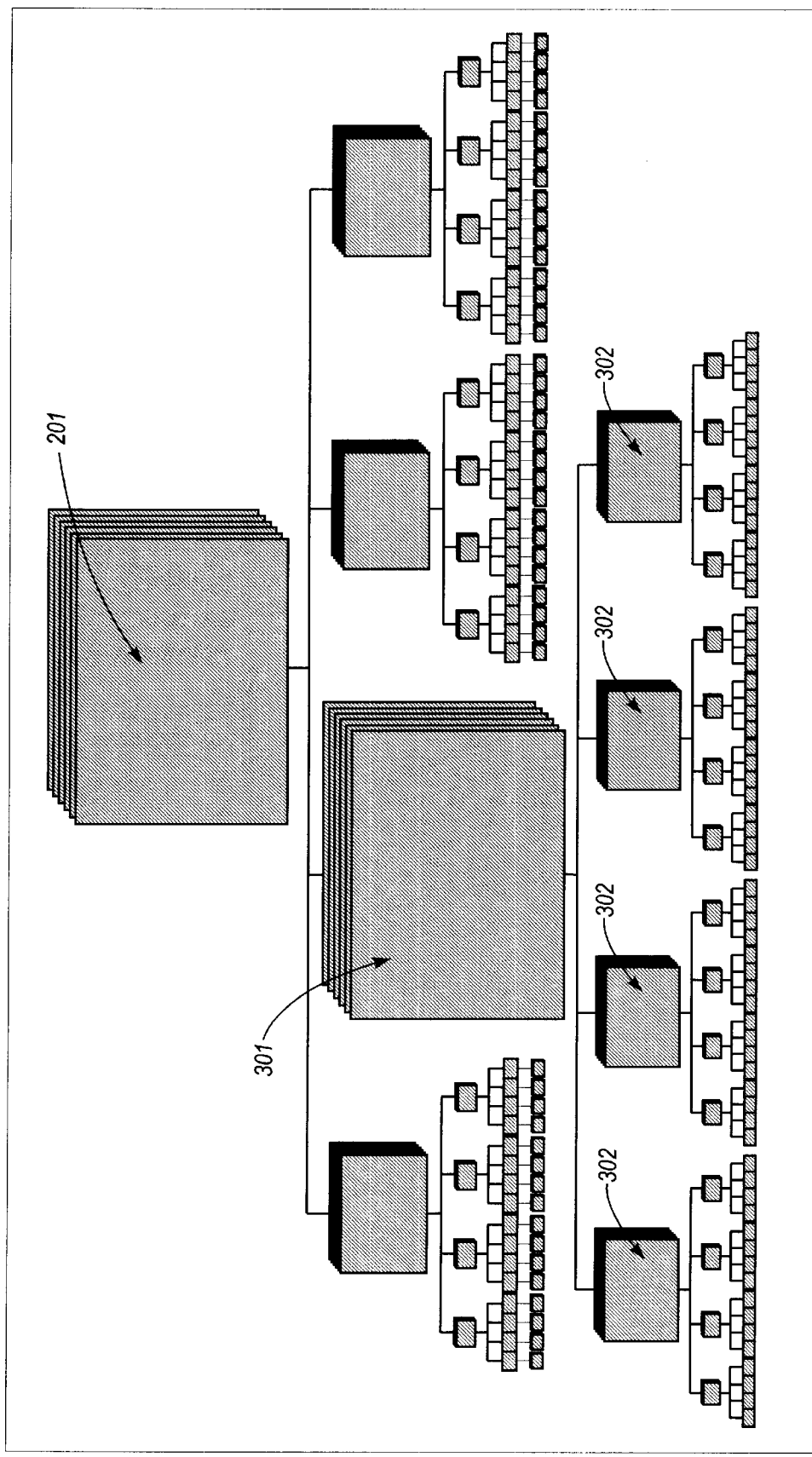
FIG. 3 is an illustration of the DOI tree of FIG. 2 with the focus node moved to a second level node, as may be displayed in the currently preferred embodiment of the present invention.

In FIG. 3, a node 301 of the tree displayed in FIG. 2 has been selected. The node 301 is on the next level down, and selection causes the changing of the DOI calculation for the nodes. When the tree is displayed, node 201 is reduced in size and child nodes 302 below the new focus node 301 in the tree are increased in size, according to the computed DOI's for the nodes. Although not illustrated, preferably the transition proceeds by a smooth animation from one state to another. It has been determined that such animation is desirable in order to keep the user oriented and unconfused about the transition and change in focus nodes.

Figure 4:
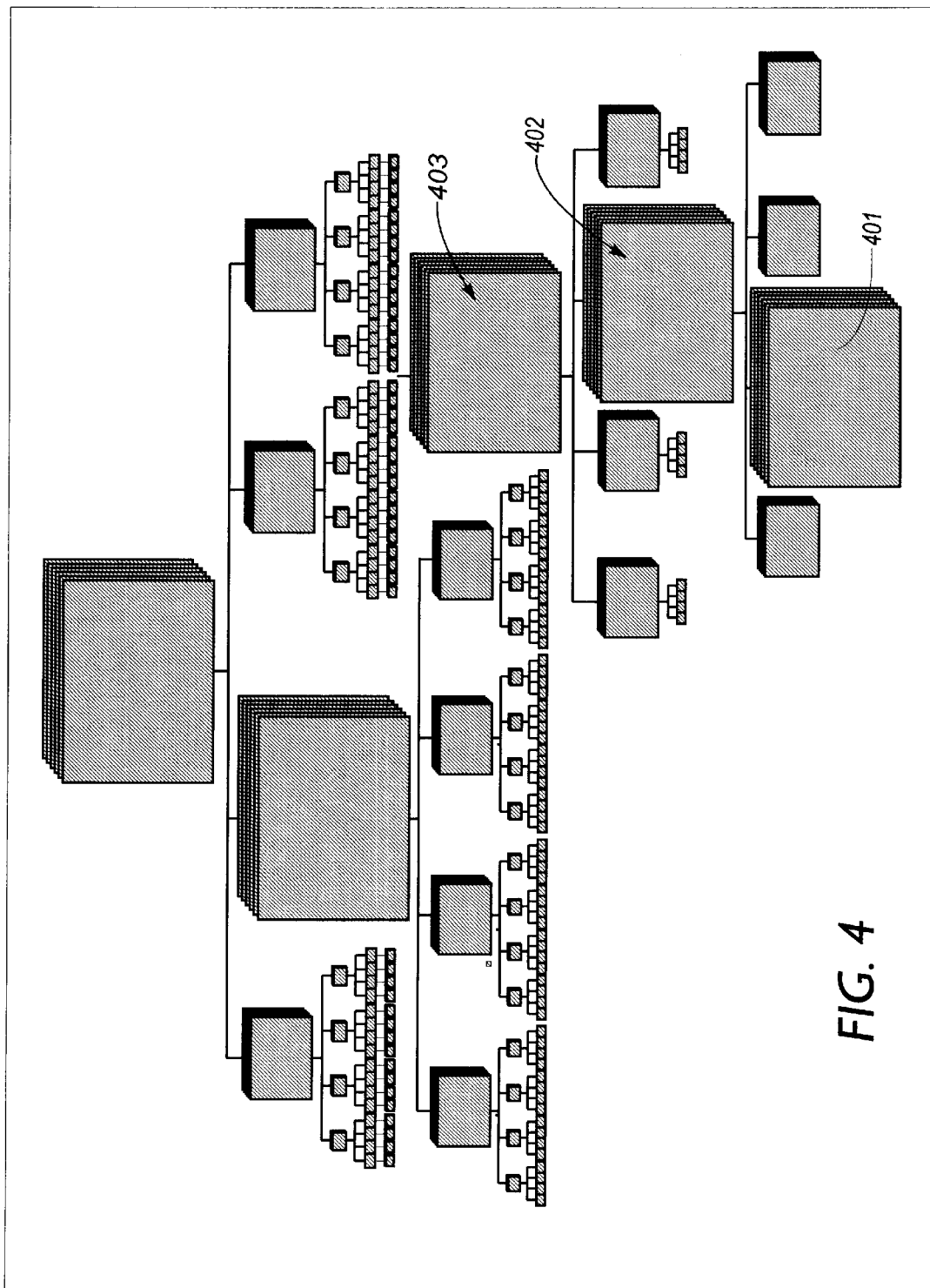
FIG. 4 is an illustration of the DOI tree of FIG. 2 with the focus moved to a leaf node so that it becomes the new focus node, as may be displayed in the currently preferred embodiment of the present invention.

Referring to FIG. 4, a user has selected one of the lowest nodes 401 either by selecting directly, or by selecting nearby nodes, causing the focus node 401 to get larger, and be more easily selectable. Note that other nodes have been re-sized based on their DOI value. For example, nodes 402 and 403 have increased in size, while nodes 301 and 201 have decreased in size. Again, this would be presented to a user via an animated transition.

Node Layout

The method for layout of nodes is as follows. There is a fixed original size for several incremental sizes of nodes.

The tree is laid out at those sizes as if there were infinite space available. If the height of the tree is larger than the height of the window, a scale factor is calculated so that it will fit vertically. The method then determines actual node sizes multiplied by the scale factor and lays out screen positions based on those sizes. When there is not enough space horizontally for the nodes at a certain level, space is allocated for the focus node and for its parents and then to their siblings in order to the right and left of the focus node until a certain percentage of the horizontal space is left. Then the horizontal space for the rest of the nodes and the subtrees below them is compressed uniformly. That is the subtree below each sibling node will be compressed horizontally so that it fits below the sibling node.

Node Compression

It has been determined that it is desirable to always display some representation of the complete tree in the available display area. However, the display area for the tree on the display is generally a fixed resource. Accordingly, the tree needs to be constrained in ways to stay within its resource. The basic DOI-based display technique very greatly reduces the pressure on that resource. Even with the technique described so far, it is possible for all the nodes not to be effectively presented on the screen. There are two cases to consider, the tree not fitting in the horizontal direction and the tree not fitting in the vertical direction. The tree not fitting in the horizontal direction is common and occurs either because of a large branching factor below one node or because, since trees increase in width exponentially, there is an accumulation of widths.

Figure 5:
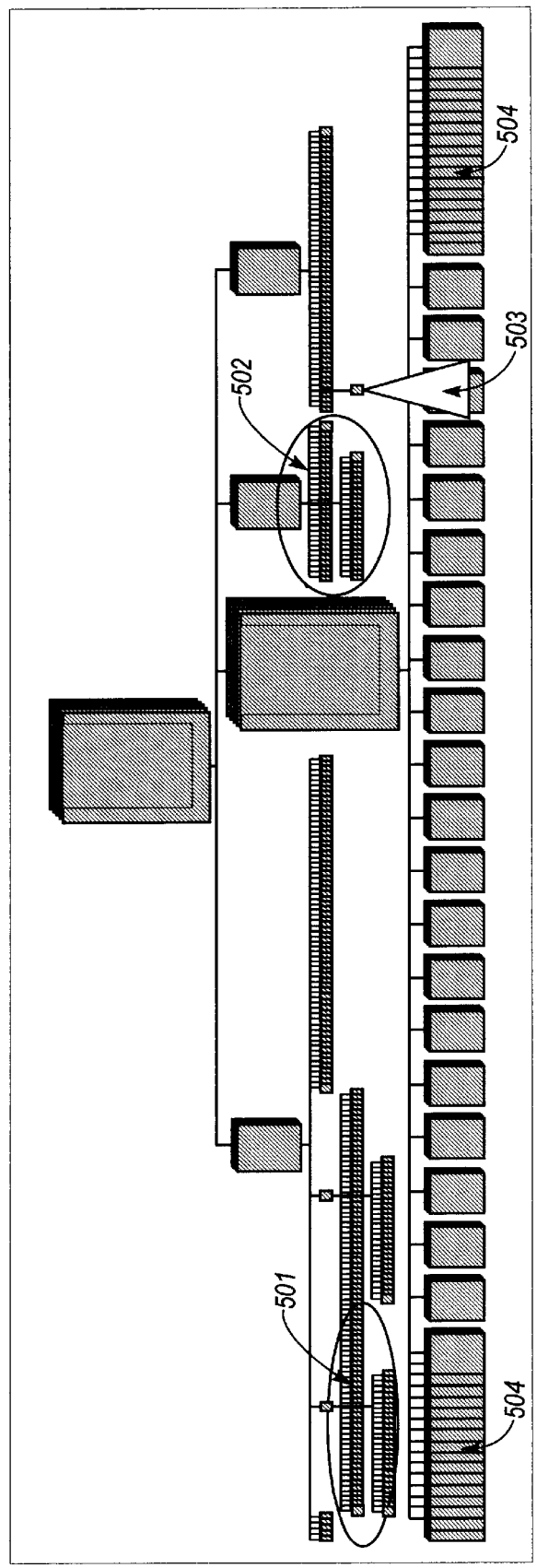
FIG. 5 is an illustration of a DOI tree showing various tree compression techniques, as may be utilized and displayed in the currently preferred embodiment of the present invention.

If the number of nodes across is large because of the accumulation of several branches, these are specially handled because the nodes below each box are laid out in the horizontal space available for each box. This pattern is visible in the tree illustrated in FIG. 5. If the branching factor is large, then the nodes are folded as for node groups 501 and 502 illustrated in FIG. 5. Folding refers to a technique wherein a node group is organized so that part of it is moved vertically below another part. If there are elided nodes below a threshold DOI value, then a triangular symbol, which will have a size proportionate to the log of the number of nodes, is used. Such a symbol is triangle 503 as shown in FIG. 5.

Figure 6:
FIG. 6 is an illustration of various predetermined areas in a display area, as may be utilized to display a DOI tree in the currently preferred embodiment of the present invention.

If the number of nodes across the display at any level is large, the available display resource into which the nodes are to be displayed is vertically divided into three regions as illustrated in FIG. 6. Referring to FIG. 6, a regular free layout zone 601, a compression zone 602, and an aggregation zone 603 are displayed. Typically 70% of the screen is in the free layout zone 601, with 20% in the combined compression zones 602, and 10% in combined aggregation zones 603. If necessary, the horizontal layout may be compressed for some of the nodes, for example by overlapping them. This is illustrated by level 504 of FIG. 5. In the currently preferred embodiment, as a cursor control device is moved over these nodes they spring to the front, overlapping their neighbors, thereby allowing the user to peruse them. When the maximum compression is reached, an aggregate representation will be made for the remaining nodes, such that selecting in this region will select that node proportionate to that region. For example, if 100 nodes are in the aggregation region, selecting 30% of the way to the edge of the display would select the $30^{th}$ node from the inward edge of the region.

Table 2 contains pseudo code that describes the laying out of a visualization structure where nodes are compressed, in greater detail.

TABLE 2

Pseudo Code For Laying Out Visualization Structure

Set X (horizontal) and Y (vertical) display screen positions for each node:
    calcExtents to determine total width necessary to layout chart
      recursively calculate total width of each level of hierarchy
      calculate unlimited width position for each node in x direction
        save maximum width of each subtree and whole tree
          assign y position of each node (row)
    setFinalPositions to assign final x positions to the children of current node
      if sufficient room available or compression factor already set
        normalLayout-for each child of the current node
        calculate normal x spacing (adjust by compression)
        setFinalPositions again for each child of current one
      else sort child list in order of DOI + localDOI value
        assign 70% of available x space in sorted list order
        calculate compression factor for the rest of the subtrees
          set final x positions of each node
      setFinalPositions on the children of each node (compressed)
    determine next appropriate scale factor to fit within current display area
        setXYs again using new scale factor
      if scale factor for display has changed
    adjust old node size values for displayed nodes using new scale factor The nodes with the highest DOIs at a level have the largest node size, (for example see node 401 of FIG. 4). This node size establishes the vertical height of a region in which to lay out the immediate descendents of all the nodes at that level. If there are too many descendents horizontally, the descendents are folded into multiple rows. Such folding into multiple rows is a common organization chart convention (with a vertical line joining the rows).

The localDOI value refers to the value at each level of the tree that determines priorities for horizontal space at that level only. This value could also be used for minor variations in the size of sibling nodes at one level.

The use of DOI to do selective node expansion (as described below) and the use of folding rows greatly increases the size of a tree that can be horizontally laid out. Further, the use of compression and aggregation zones permits all trees to be fit within a fixed display space. It can also happen that a tree would be too deep vertically to fit within its space. In this case, nodes are either elided lower in the tree or in the middle, depending on the DOI. The term elide or elided is taken to mean that the nodes are not displayed and not that the node or its underlying data is deleted. First, a threshold DOI is established so if the nodes for a tree are less than the threshold DOI, then they are elided and replaced by an elision graphic. Since nodes decrease in elliptical importance with distance from the root and in distance importance with distance from the focus node(s), then a very deep tree would tend to show some nodes around the root and some nodes around the focus node, typically causing some of the intermediate nodes to be elided. However, the currently preferred embodiment provides for creation of the elision graphic above a node at a certain distance above the focus node. The elision graphic would represent nodes elided including the root node. The width of the symbol is proportional to the log of the number of nodes represented. The number of levels above the focus to display may be controlled by a variable specified by the user.

When the DOI is lower for the lower part of the tree, as happens for subtrees being fit within a node height or which would hit the bottom of the display area, the lower part of the tree is replaced by an appropriately proportioned elision graphic, e.g. a triangle whose width is proportional to the log of the tree width and whose height is proportional to the tree depth.

Node Expansion

It can be that as in FIG. 2, the use of the techniques described so far may leave unused space in the display area. Therefore, the present invention provides for a user to expand part of the tree into this unused space. Unused space commonly results from an upper limit on node size which causes the tree to take up less vertical space than is available in a typical window. It has been determined that enlarging to fit vertically would cause the nodes to become unusually large and appear to be distorted. Further, it would limit horizontal space, which it has been found to be more crowded.

Node expansion occurs when there is still vertical space available on the display. Expansion occurs on the "most interesting node". The number of levels below the focus node to expand automatically can be controlled by the user. A practical limit has been found to be three or four levels. The limit is necessary to prevent a very deep tree from scaling so that all of the nodes become too small. Node expansion at each level will occur on the "most interesting node".

Table 3 provides pseudo code describing such node expansion:

TABLE 3

Pseudo Code For Node Expansion

Find current node to be expanded
  find most interesting child of current node
    for each child of current node
set localDOI to lower value as move away from most interesting one
    decrement node fade value
  if this is most interesting node, expandDescendants of this node
  else markDescendants as above with lower DOI and fade values The tree is automatically expanded below the focus node by choosing the node in the level below with the most descendants. The next level below that node is expanded in the same way until the entire depth of the tree is shown or the user-specified number of levels is reached. This is done whenever the user chooses a new node to focus on which shows the expansion of the branch of the tree with the current node. The nodes selected at each level to expand form a "spine" of nodes that are represented in the large size about twice as large as their medium sized sibling nodes. This allows room for the display of the tree structure below the siblings using the smallest size nodes. Because the size of the nodes in the spine of this expansion are nearly the same, a "fade" value is used to make all of the nodes smaller at each level away from the current focus. This prevents the automatic scaling from making all of the nodes too small for very deep trees. The nodes close to the focus are thus always displayed in a relatively large size.

There are several ways for determining or otherwise identifying the "most interesting node" to expand. This can be an automated process or one based on user input. Some examples are: (1) This could be the node with the highest DOI on a level, or (2) it could be a node identified based on user supplied search terms.

Figure 7:
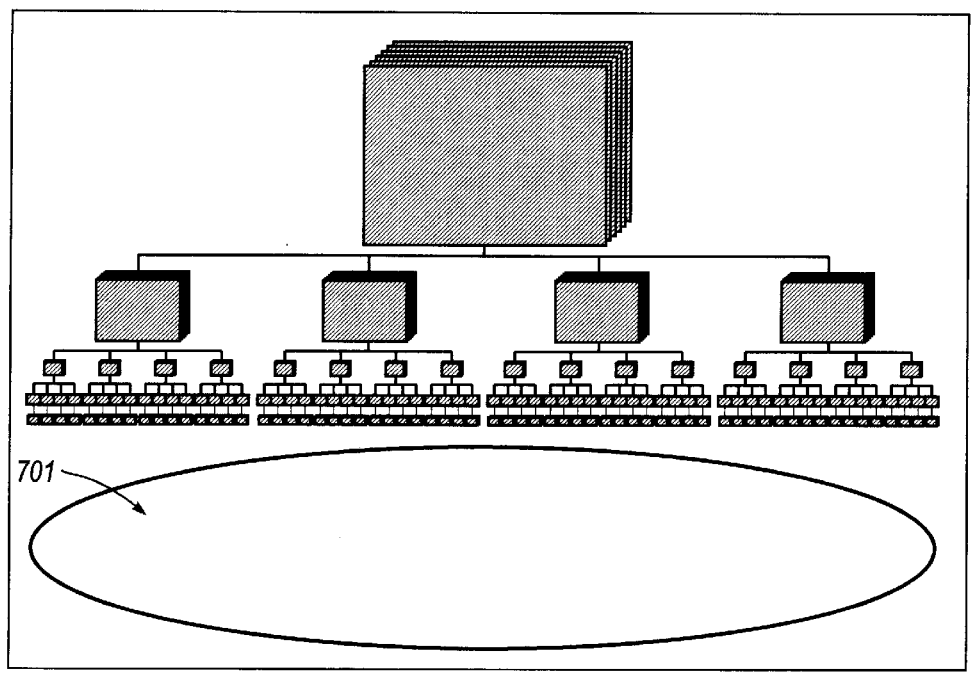
FIGS. 7 and 8 are illustrations of the DOI tree of FIG. 2 with and without using the Expand to Fit techniques of the currently preferred embodiment of the present invention.
Figure 8:
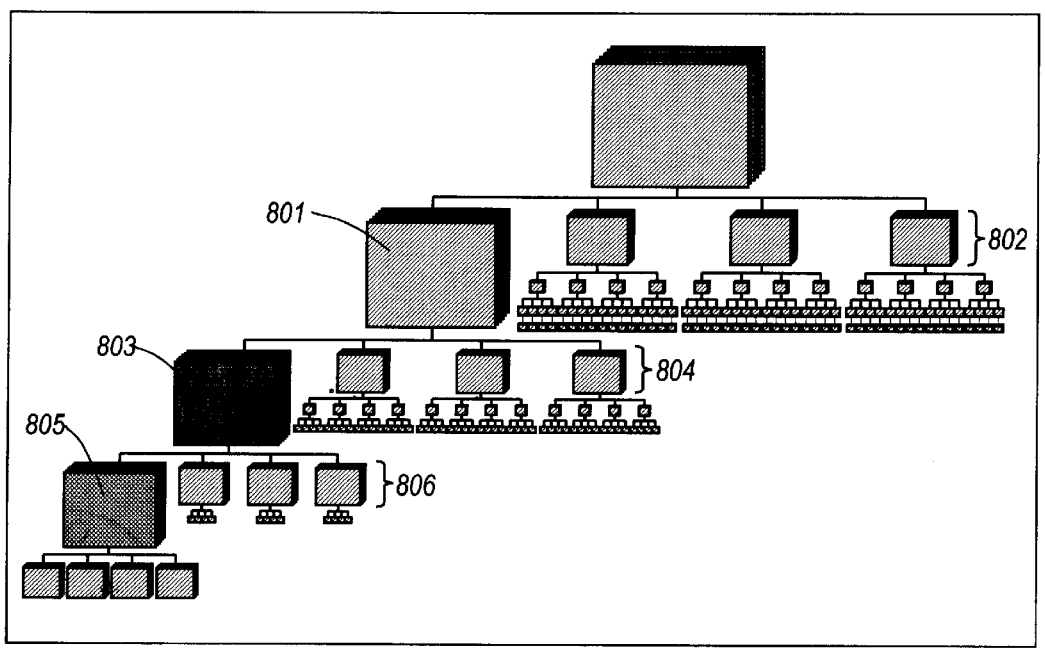

FIGS. 7 and 8 illustrate the tree of FIG. 2 expanded according to the subtree with the most nodes. Referring to FIG. 7, the tree does not take up the entire display area, as illustrated by the unused area 701. Referring to FIG. 8, the node 801 and descendants comprise the subtree with the highest number of subnodes. At the level 802, the node 801 and its subtree has been expanded. This continues so at level 804, the node 803 and its subtree is expanded and at level 806 the node 805 and its subtree is expanded. As illustrated, the node expansion continues until the bottom nodes or "leaves" of the tree are reached.

It should be noted that node expansion is a slight departure from the basic general concept described above. However, node expansion has been found to be very useful in that it often provides insights into search levels beyond what would normally be provided (as many as 6 levels). This could dramatically decrease search times for particular information.

Data Item Information Display

Each node typically has a number of data items to be displayed. For example, for an organization chart, the data items to be displayed could include fields such as Post, Post it reports to, Name, Title, Office extension, Email, Picture file link, Home page link, etc. The larger the number of data items to be displayed, a bigger display surface area for a node is needed. For the focus node, the majority of the information may be displayed.

As discussed above, nodes will typically be of different sizes. As nodes get smaller, there is less room to display this information. Information displayed on the nodes is ranked by priority and as the nodes have less space the items with the higher priority are displayed. The present invention provides several techniques to allow the information to fit on a node:

1. Data deletion. Smaller nodes only display some of the data items.
2. Word abbreviation. Words and phrases are abbreviated if there is not room on the line where they are displayed. Different text abbreviation rules are applied according to the type of information (Names, phone numbers, email addresses). A substitution table is also read from a file to substitute abbreviations for common words when needed. For example, Vice President becomes V.P.
3. Node rotation. The normal view of nodes shows them as 3D boxes (illustrated in FIG. 10). Using a gesture such as dragging the cursor left or right on a box makes the boxes appear to rotate such that another face of the boxes is now in the front. This allows more data items to be presented. Software based programming techniques for performing such node rotation to present different information is well known in the art.

It should also be noted that all or some of these techniques could be utilized. Alternatively, another window could be displayed alongside the structure to display all of the information.

Animation of Tree Transitions

User orientation in the tree is preserved by making the views of the tree animate into each other. The animation time is set at a desirable level, usually in the range of (0.7~1.0 sec) (see Card, S. K., Moran, T. P. and Newell, A., The Psychology of Human Computer Interaction, Hillsdale, J. M: Erlbaum (1983)). The average draw time per frame for recent frames is used to set the number of animation frames that can be drawn in this time. This is used to calculate the in-between positions of the boxes.

A tree transition is calculated based on a begin state and an end state of the tree. Generation of an end state is initiated, for example by a user selecting a new focus node.

Applications

The present invention has been applied in providing an interactive browser of node-link structures. The invention could be applied in a variety of contexts in which node-link structures are visualized. In particular, the invention could be applied in visualizing web-related structures such as the structure formed by a cached set of web pages or other web objects.

More generally, the invention could be applied to provide a browser for organization charts, file system hierarchies, hypertext hierarchies, world wide web connectivity structures, parts breakdowns, SGML structures, or any other large node-link structures. The browser could be used in editing structures or their contents.

Items in the tree can be linked to arbitrary Uniform Resource Locator (URL) pages or to programs, such as an email program. Hence, the tree can act as a browser to initiate display of web data. The tree as a browser operates more quickly than a conventional web browser, because a group of the pages can be viewed on the screen together and their relationship with other pages shown.

Described below are possible applications.

Figure 9:
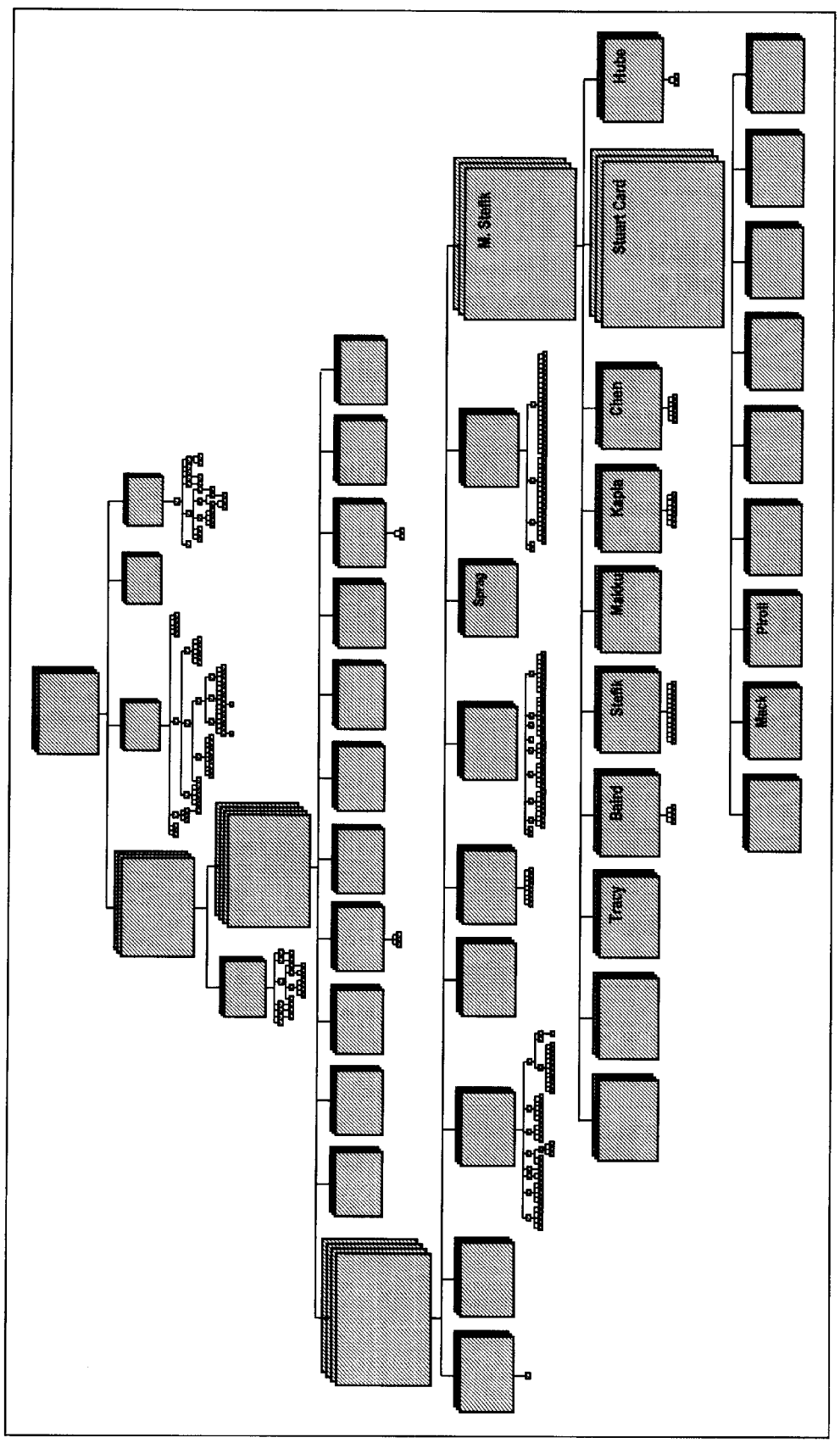
FIG. 9 is an illustration of a large organization chart as may be displayed by the currently preferred embodiment of the present invention.

(1) Organization Chart. One use of this is for organization charts in which the nodes serve as links to supporting data as in FIG. 9. This chart has over 400 nodes, is accessible over the Web, and combined all the information contained in 12 separate organization charts (each of which filled a page). By searching for a name or by browsing the chart, the details of the individual organizations is revealed. Furthermore, the chart serves as a gateway into the organizational home pages of the different organizations (accessed by clicking the appropriate link within the node). It also can be used to access email to any of the individuals whose email is given on the chart by simply clicking the link.

(2) Web Sites. Another use is for views of Web sites, which have been coerced or otherwise reduced into tree form. Thumbnail miniatures of pages can be displayed in the nodes. Full size displays of the pages can be displayed alongside the tree using a suitable web browsing application.

(3) Web site statistics. The DOI of individual pages in a web site can be set to a function of the number of hits that page has received in some predetermined interval of time such as the previous month or week or hour or other time period. Or some function representing a way of weighting period of access could be employed (for example, weighting hits as a declining exponential of days before present). Thus, site sponsors can watch the activity of their web sites. The weighting period could even be reduced to minutes so that sponsors could watch the immediate activity on their sites.

Figure 10:
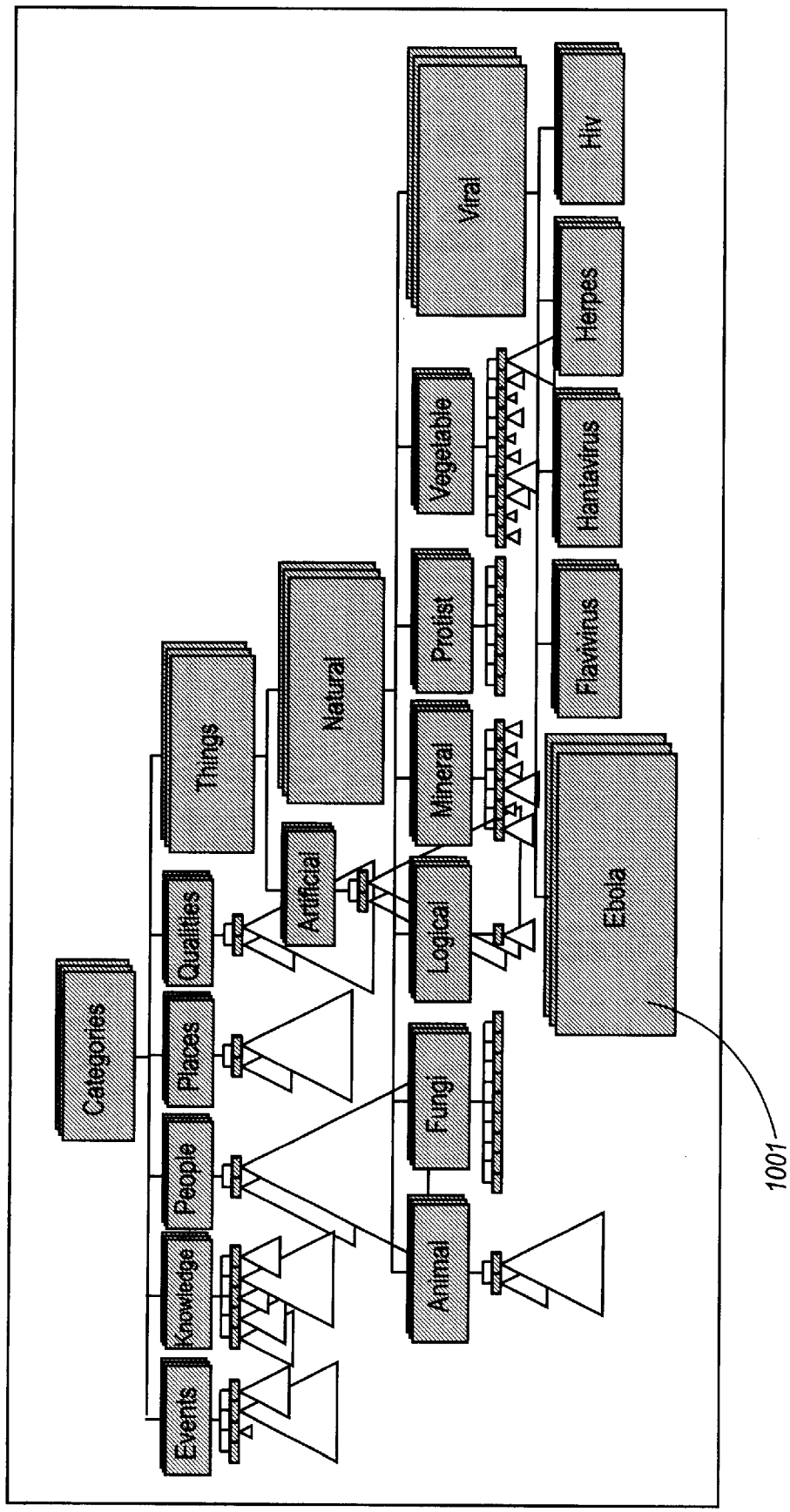
FIG. 10 is an illustration of a representation of a large database with a leaf node being located as the subject of a search and thus being displayed as a focus node, as may be displayed in the currently preferred embodiment of the present invention.

(4) Databases. Data bases that are expressible by trees can be displayed and searched. For example, the 7000 node taxonomic database used for competitive tests by ACM/SIGCHI is shown in FIG. 10. This competition is described in the publication Mullet, K., Fry, C., Schiano, D., "On Your Marks, Get Set, Browse!" in Human Factors in Computing Systems, CHI '97 (Extended Abstracts) 1997, Atlanta Ga. ACM. In this competitive test, contestants present visualizations of the database which are then searched to find particular data items. By following the higher level groupings, the user has found the node 1001 entitled "Ebola Virus". An advantage of using the DOI Tree for searching is the entire tree is always visible which helps the user maintain the context of individual nodes. Also related relevant nodes are always given more space in the standard layout while the user is browsing the tree. The automatic expansion below the focus node can help understand the branch of the tree that contains the new focus.

Figure 11:
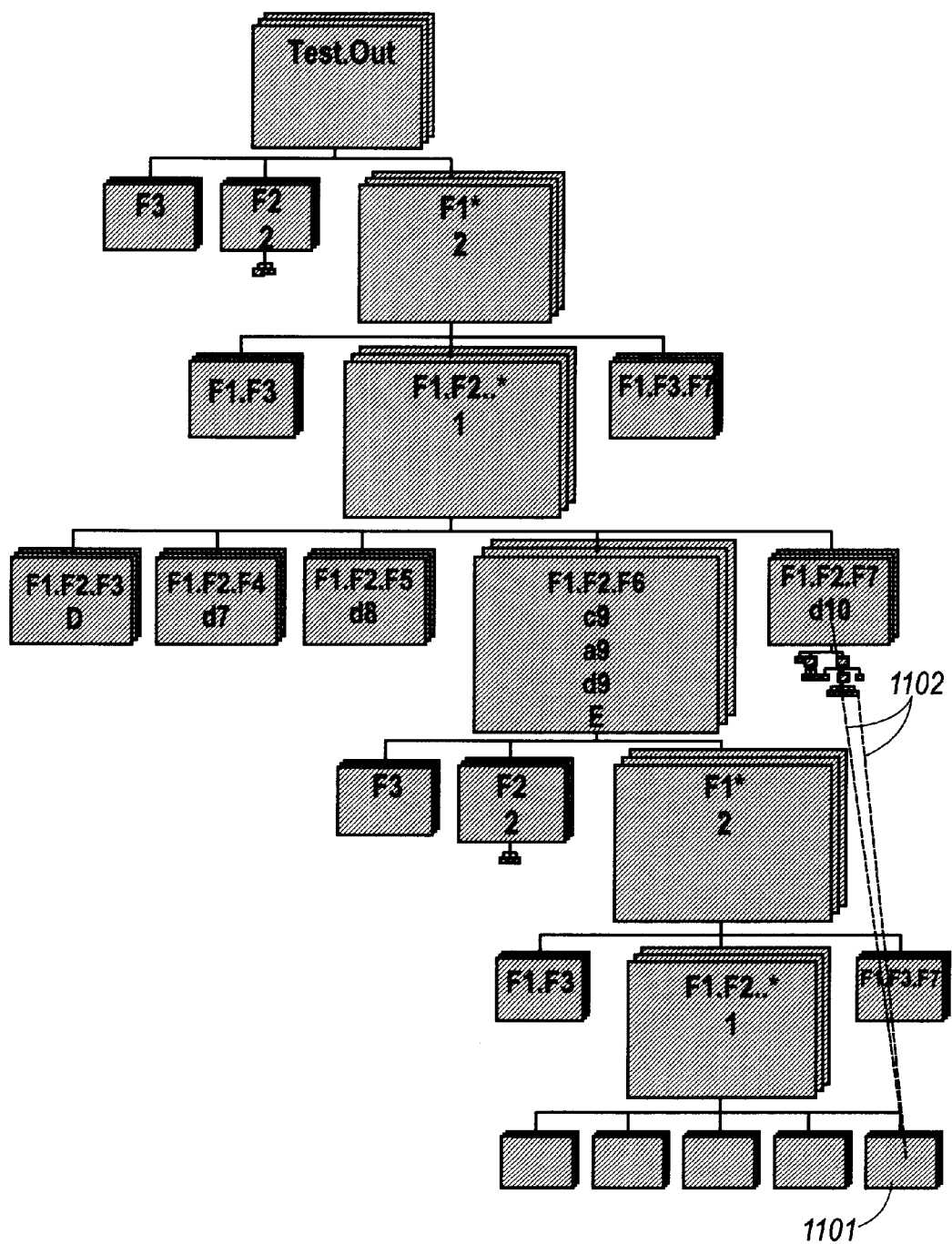
FIG. 11 is an illustration of a tree derived from a database with multiple links per node, wherein one node is used to generate the tree structure and other links become visible upon some user action, as may be displayed in the currently preferred embodiment of the present invention.

(5) Multilinked databases. The nodes can be items in a database as in FIG. 11. The items in the database are coerced or otherwise converted into a tree structure. However, the items in the database have multiple links to other items in the database. One set or class of links is used to create the tree structure. Typically, this class of links will be indicative of some relationship between those items. In this application, additional links to other items may be displayed when a predetermined user action is performed, e.g. a user moving a cursor over any item. This is illustrated by the links 1102 on item 1101.

In another way of presenting a general graph with multiple links, multiple instances of a node may be presented in the structure. This may be based on a particular manner of creating the structure from the database. In this case, the displayed links may point to other instances of the node. Such duplicated nodes may be displayed so that they are visually distinct from other nodes (e.g. by different color, shape etc.).

By using these techniques, complex structures that would be difficult to plot as generalized graphs are plotted as trees, but the other linkages can still be investigated. In the case where some of the nodes are aggregated together with a triangle under a node the line is drawn to the triangle.

Figure 12:
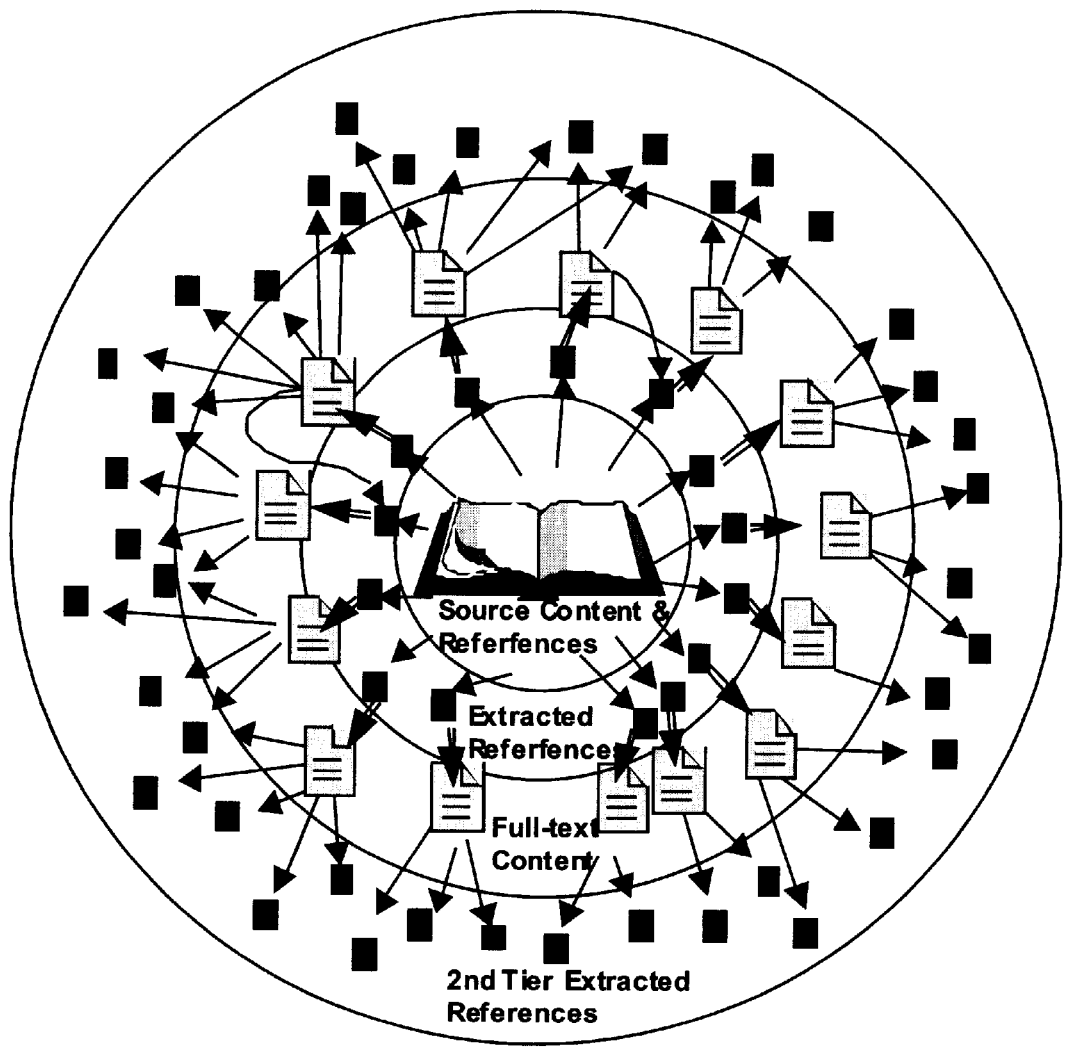
FIG. 12 is an illustration of a biblioplex showing multiple generations of linkages from a main document, as may be displayed in the currently preferred embodiment of the present invention.

(4) Bibliographies. A biblioplex as described in co-pending U.S. application serial no. 09/488,563 filed Jan. 21, 2000, is a set of documents described generated by traversing successive generations of citations as in FIG. 12. This can be displayed as a DOI tree. The DOI for individual nodes can be computed through spreading activation among the linkages (see U.S. Pat. No. 5, 895,470) or through cocitation analysis (see U.S. Pat. No. 6, 038, 574).

(5) Email streams visualization. Email streams can be represented as trees. The DOI for these streams could be generated based on the content similarity and tree closeness.

Control Panel

Figure 13:
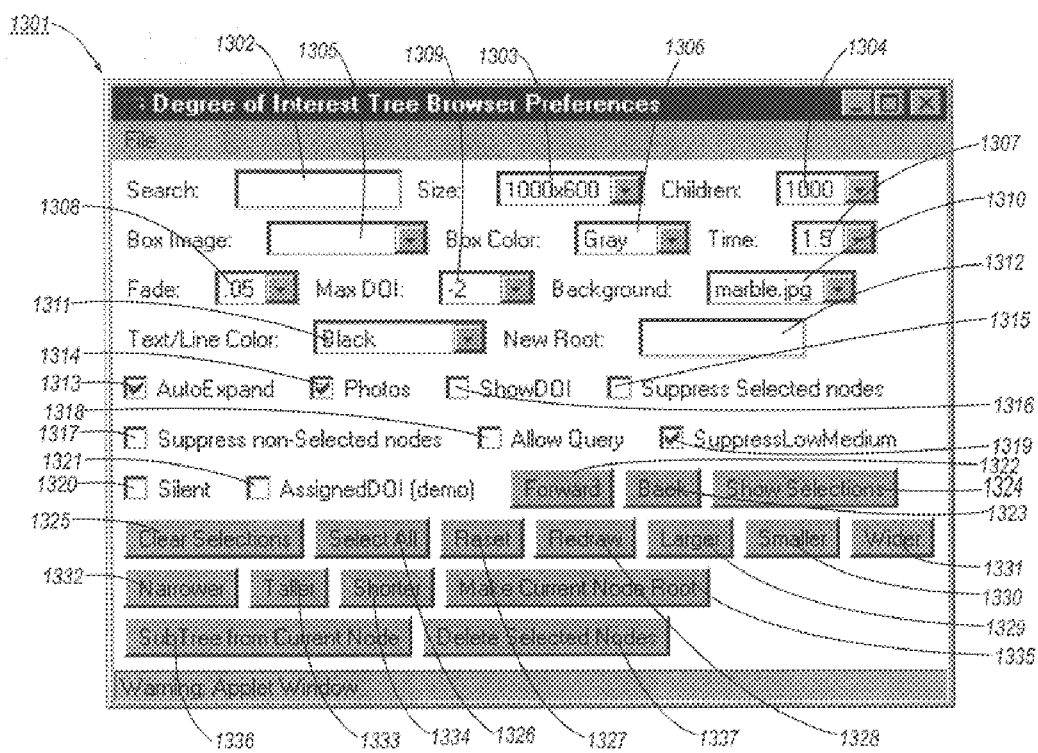
FIG. 13 is an illustration of a control panel for controlling the DOI tree visualization of the currently preferred embodiment of the present invention.

FIG. 13 illustrates a control panel 1301 that may be presented to a user and used to provide visualization preferences, as well as to specify a search term (field 1302). In the currently preferred embodiment of the present invention, there can be more than one focus node. Typically, this would occur when some type of search is performed against the data in the items of the visualization structure.

Referring back to FIG. 13, the various other controls include fields and checkboxes for specifying parameters for the visualization and command buttons for causing specific commands to be carried out. Field 1303 provides for specifying the size of the display area, field 1304 provides for specifying the number of child nodes to be displayed before folding, field 1305 specifies an image to be used for the "box" representing a node, field 1306 is used to specify the color of the box, field 1307 is used to specify a transition time for animation purposes, field 1308 is used to specify the "fade" value for determining the final DOI value used when rendering a node, field 1309 is used to specify a maximum DOI value before elision, field 1310 is used to specify a background image for the visualization, field 1311 is used to specify the color for lines and text, field 1312 is used to enable the specification of a new root node, checkbox 1313 is used to specify that node expansion should occur, checkbox 1314 is used to specify that photos can be displayed, checkbox 1316 is used to specify that the DOI value for the nodes should be displayed, checkbox 1315 is used to specify that selected nodes should be suppressed, checkbox 1317 is used to specify that non-selected nodes are to be suppressed, checkbox 1318 is used to Allow a Query, checkbox 1319 is used to specify suppression of Low Medium nodes, checkbox 1320 is used to turn sound on or off, checkbox 1321 is to enable the user assignment of DOI values.

Button 1322 is for traversing forward through the tree based on prior commands, Button 1323 is for traversing backward through the tree based on prior commands, button 1324 is for displaying all the nodes that had been previously selected, button 1325 is for clearing the memory of previously selected nodes, button 1326 is for causing selection of all the nodes, button 1327 is for resetting any memory of previously entered commands, button 1328 is for causing the tree to be redrawn, button 1329 is for causing the tree to be drawn with larger blocks, button 1330 is for causing the tree to be drawn with smaller boxes, button 1331 is for causing the tree to be drawn with wider boxes, button 1332 is for causing the tree to be drawn with narrower boxes, button 1333 is for causing the tree to be drawn with taller boxes, button 1334 is for causing the tree to be drawn with shorter boxes, button 1335 is for causing the current focus node to be the root node, button 1336 is for causing a visualization of a subtree based on the current focus node to be displayed, and button 1337 is for causing selected nodes to be deleted.

An alternative implementation would provide for certain frequently used control functions to be presented on a tool bar positioned within the window or display area. Use of toolbars is well known in the art of user interfaces for computer based systems.

Software System Configuration

Figure 14:
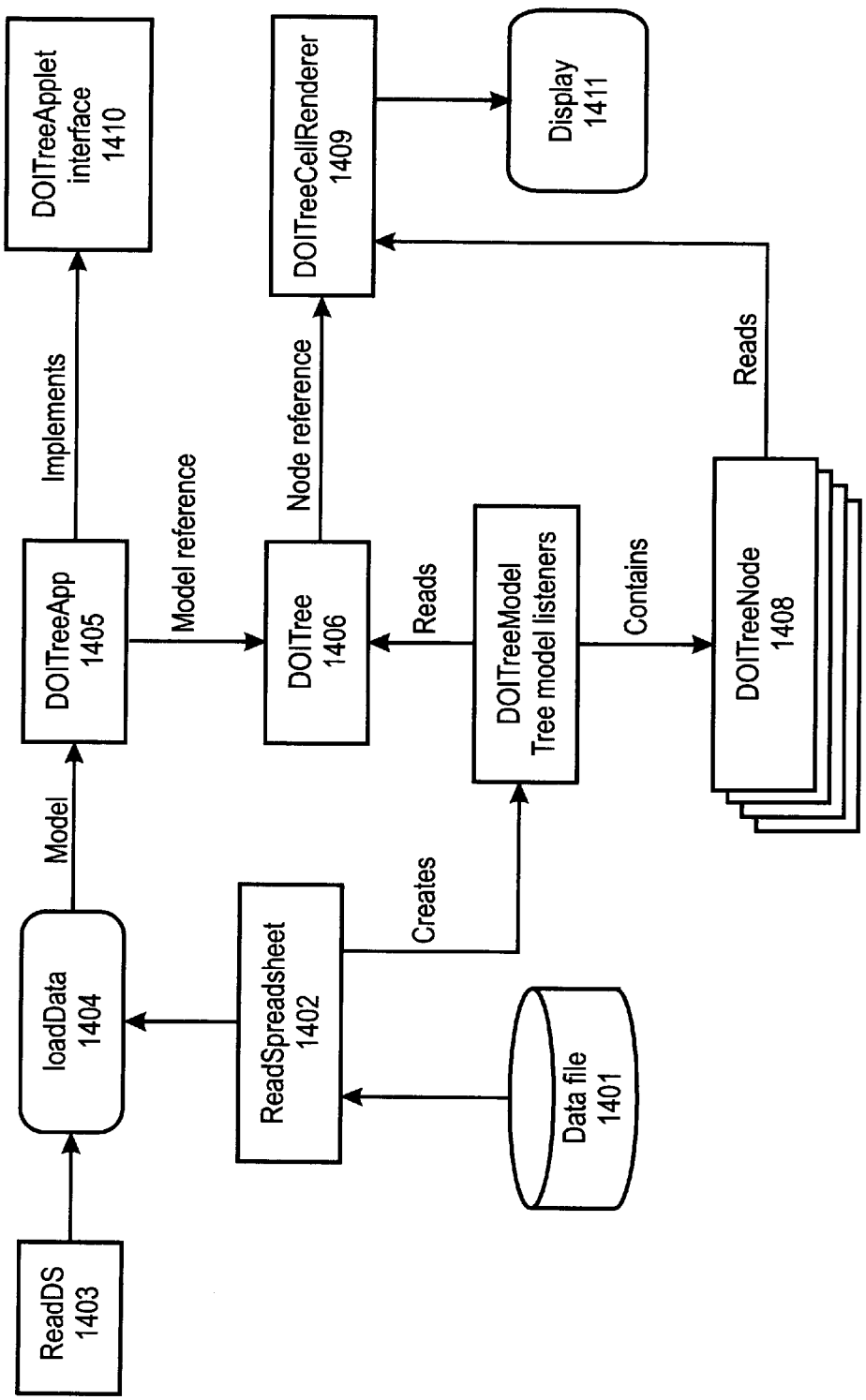
FIG. 14 is a block diagram illustrating the functional software implemented components and data flow as may be used to implement the currently preferred embodiment of the present invention.

FIG. 14 is a block diagram illustrating the functional components and data flow of the currently preferred embodiment of the present invention. Referring to FIG. 14, the DOITreeApp 1405 is the main program. It can either be implemented as a Java program or can be an applet. An applet is a piece of software code that is typically intended for execution in a Web Browser. As mentioned above, the currently preferred embodiment of the present invention is implemented using the Java® programming language for operation on a Java® enabled web browser. Thus, the currently preferred embodiment is implemented as an applet. The DOITreeApplet interface 1410 defines an interface for other commonly used and publicly available applet functions that are used to implement the DOITree system such as playAudioClip, showDocument, getImage, etc.

DOITreeApp 1405 starts DOITree 1406 providing it with a DOITreeModel 1407. The DOITree Model 1407 defines the data to be used for creating the tree. The model contains a set of DOITreeNodes 1408 in a hierarchical structure. The data for each node is read from a data file 1401 using a utility such as loadData 1404 that uses ReadSpreadsheet 1402 ReadDS 1403 or other input routines depending on the format of the data. The manner in which the data file 1401 is created is described in greater detail below. ReadSpreadsheet 1402 uses an input format where the data for each node is on a line in a text file and fields of data are tab delimited. This is a format that can be produced by commercially available spreadsheet or database software.

Once DOITree 1406 is started, it receives input from the user via mouse or keyboard controls. DOITree 1406 determines the layout, size and position of nodes in the tree displays. DOITree 1406 calls DOITreeCellRenderer 1409 to draw each node on the display 1411 and also connecting lines, images and other text or graphics on the display 1411.

In the currently preferred embodiment, the software is organized in such a way that the main layout program element and renderer (DOITree 1406 and DOITreeCellRenderer 1409) can be imbedded into other software and treated as a viewer for tree data. Programming in the Java environment would be well known to one of skill in the art and thus no further discussion or description of the programming techniques used to implement the currently preferred embodiment is deemed necessary.

As noted above, the underlying data is stored in data file 1401. In the currently preferred embodiment, this data represents the basic structure used to display the visualization. Such data can be static or generated dynamically in whole or in part. The data for DOI Trees can be stored in and derived from a database or it can also be read from tab-delimited files. Users can thus prepare and edit trees for DOI Tree display by using a spreadsheet application, such as Microsoft Excel®, and saving the entered data as a tab-delimited file. In a tab-delimited file, the tabs will indicate a separation of data items and node information.

It should also be noted that the tree may be built interactively, so that nodes may be dynamically added or removed from the tree structure. Also, such a tree structure may be built interactively by extracting information from a database responsive to user inquiries.

Overview of Computer Based System

Figure 15:
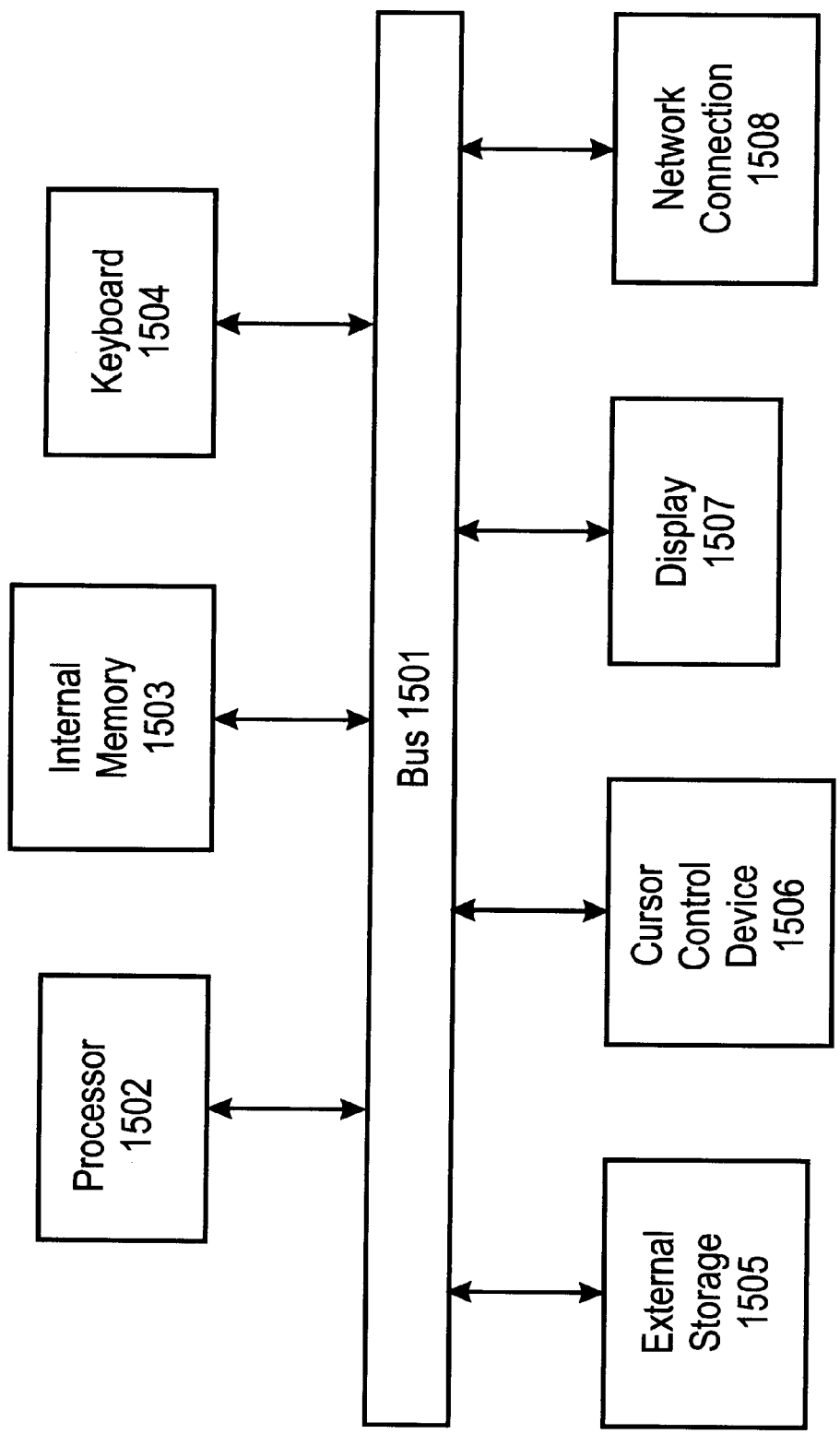
FIG. 15 is a block diagram of a computer-based system as may be utilized to implement the currently preferred embodiment of the present invention.

A computer based system on which the currently preferred embodiment of the present invention may be implemented is described with reference to FIG. 15. The currently preferred embodiment of the present invention has been implemented on computer based systems using the Windows® Operating System and the Internet Explorer) Browser Application (both Trademarks of Microsoft Corporation of Redmond, Wash.). As noted above, the present invention is implemented using software programming instructions written in the Java® programming language for execution on a computer based system. Java is a trademark of Sun Microsystems of Mountain View, Calif. Thus, it is anticipated that the currently preferred embodiment of the present invention may operate on any computer based system supporting a Graphical User Interface and the Java Operating environment. In any event, referring to FIG. 15, the computer based system is comprised of a plurality of components coupled via a bus 1501. The bus 1501 may consist of a plurality of parallel buses (e.g. address, data and status buses) as well as a hierarchy of buses (e.g. a processor bus, a local bus and an I/O bus). In any event, the computer system is further comprised of a processor 1502 for executing instructions provided via bus 1501 from Internal memory 1503 (note that the Internal memory 1503 is typically a combination of Random Access and Read Only Memories). Instructions for performing such operations are retrieved from Internal memory 1503. Such operations that would be performed by the processor 1502 would include the processing steps described in the flowchart of FIG. 1 and the accompanying descriptions. The operations would typically be provided in the form of coded instructions in a suitable programming language using well-known programming techniques. The processor 1502 and Internal memory 1503 may be discrete components or a single integrated device such as an Application Specification Integrated Circuit (ASIC) chip.

Also coupled to the bus 1501 are a keyboard 1504 for entering alphanumeric input, external storage 1505 for storing data, a cursor control device 1006 for manipulating a cursor, a display 1507 for displaying visual output and a network connection 1508. The keyboard 1504 would typically be a standard QWERTY keyboard but may also be telephone like keypad. The external storage 1505 may be fixed or removable magnetic or optical disk drive. The cursor control device 1506, e.g. a mouse or trackball, will typically have a button or switch associated with it to which the performance of certain functions can be programmed. The display 1507 may comprise one or more physical display monitors. The network connection 1508 provides means for attaching to a network, e.g. a Local Area Network (LAN) card or modem card with appropriate software. Besides communication access, the network connection 1508 may be used to access various resources (i.e. servers) such as shared computing, storage or printing resources.

The invention has been described in relation to software implementations, but the invention might be implemented with specialized hardware built to operate in a systems architecture as described above.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method for displaying a representation of an entire collection of linked information using a visualization technique in a display area, said the linked information comprised of a plurality of nodes each having one or more links to other of the plurality of nodes, the method comprising:
   a) identifying one or more focus nodes from the plurality of nodes;
   b) generating a degree of interest (DOI) value for each of the plurality of nodes, the DOI value relative to the one or more focus nodes;
   c) assigning a node display size to each of the plurality of nodes in response to their DOI values, each of the assigned node display sizes being a one of a limited set of node display sizes, nodes with a higher DOI value being assigned a larger node display size:
   d) generating a first lay out of the plurality of nodes according to the visualization technique so that the representation is displayed completely in the display area;
   e) displaying the linked information based on the first lay out in the display area.

2. The method as recited in claim 1 wherein generating a DOI value for each of the plurality of nodes further comprises:
   b1) assigning a highest DOI value to said one or more focus nodes;
   b2) for each sibling of the focus nodes assigning a DOI value less than the highest DOI value and based upon an order of the sibling node; and
   b3) for all remaining nodes, assigning a DOI value less than that of the parent node.

3. The method as recited in claim 2 further comprising:
   f) detecting that a user has selected a new focus node;
   g) generating an updated DOI value for each of the plurality of nodes relative to the new focus node;
   h) reassigning node display sizes in response to the undated DOI value:
   i) using the updated degree of interest value for each of the plurality of nodes to generate a second lay out of the linked information according to the visualization technique so that the representation of the linked information is displayed completely in the display area; and
   j) animating on the display a transition from the first lay out to the second lay out.

4. The method as recited in claim 1 wherein generating the first lay out of the said plurality of nodes further comprises:
   d1) determining size constraints for the display area;
   d2) generating the first lay out of the nodes in a manner such that nodes with highest DOI values are most completely displayed;
   d3) adjusting display of nodes with lower DOI values based on the size constraints for the display area.

5. The method as recited in claim 4 wherein adjusting display of nodes with lower DOI values based on the size constraints for the display further comprises performing node compression.

6. A program storage device readable by a machine, tangibly embodying a program of instructions executable by the machine to perform a method of displaying a representation of an entire collection of linked information using a visualization technique in a display area, the linked information comprising a plurality of nodes each having one or more links to other of the plurality of nodes, the method comprising:
   a) identifying one or more focus nodes from plurality of nodes;
   b) assigning a highest degree of interest (DOI) value to each of the focus nodes;
   c) for each sibling of the focus nodes assigning a DOI value less than the highest DOI value and based upon an order of the sibling node:
   d) for all remaining nodes, assigning a DOI value less than that of the parent node:
   e) assigning a node display size from to each of the plurality of nodes in response to the DOI values to each of the plurality of nodes, the assigned node display size being a one of a limited set of node display size, nodes with a higher DOI being assigned a larger node display size;
   f) generating a first lay out of the plurality of nodes according to the visualization technique so that the representation of the linked information is displayed completely in said display area;
   g) displaying the first lay out of linked information in the display area.

* * * * *